US011755263B2

(12) United States Patent
Kuroda

(10) Patent No.: US 11,755,263 B2
(45) Date of Patent: Sep. 12, 2023

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Shigeki Kuroda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 72 days.

(21) Appl. No.: 17/410,831

(22) Filed: Aug. 24, 2021

(65) Prior Publication Data
US 2022/0066705 A1 Mar. 3, 2022

(30) Foreign Application Priority Data

Aug. 31, 2020 (JP) .................................. 2020-145982

(51) Int. Cl.
G06F 3/12 (2006.01)
(52) U.S. Cl.
CPC ............ G06F 3/122 (2013.01); G06F 3/1226 (2013.01); G06F 3/1261 (2013.01); G06F 3/1292 (2013.01)
(58) Field of Classification Search
None
See application file for complete search history.

(56) References Cited

U.S. PATENT DOCUMENTS

2019/0056894 A1* 2/2019 Hasegawa ............. G06F 3/1232

FOREIGN PATENT DOCUMENTS

| CN | 109445722 A | * | 3/2019 |
| CN | 111897500 A | * | 11/2020 |
| JP | 2012133489 A | | 7/2012 |
| JP | 2015135607 A | * | 7/2015 |
| JP | 2015228178 A | * | 12/2015 |

* cited by examiner

Primary Examiner — Fan Zhang
(74) Attorney, Agent, or Firm — Canon U.S.A., Inc. IP Division

(57) ABSTRACT

An information processing apparatus configured to communicate with a cloud print service includes at least one memory that stores a set of instructions, and at least one processor that executes the instructions, the instructions, when executed, causing the information processing apparatus to perform operations including determining whether transmission of a print job to a printer associated with a cloud printer not via the cloud print service is allowed in a case where the cloud printer on the cloud print service is selected as an output destination, and transmitting the print job to the printer associated with the cloud printer through a path not via the cloud print service in a case where it is determined that transmission of the print job to the printer associated with the cloud printer not via the cloud print service is allowed.

12 Claims, 10 Drawing Sheets

FIG. 7

EXAMPLE OF PRINTER INFORMATION MANAGED BY CPS 1022 IN ASSOCIATION WITH TENANT OF COMPANY A

| No. | PRINTER NAME | URI OF PRINTER THAT PERFORMS PRINTING (IP ADDRESS/HOST NAME) | STATUS | LOCATION INFORMATION | PRINTER METADATA | SHARE INFORMATION | PRINT SETTINGS | UPPER LIMIT SIZE OF RECEPTION |
|---|---|---|---|---|---|---|---|---|
| | | | | LATITUDE/LONGITUDE/ALTITUDE SECTION/FLOOR/ROOM NUMBER ADDRESS/ZIP CODE | MFP 101, SERIAL NUMBER, REGISTRATION DATE | SHARED PRINTER SHARE NAME SHARE ID | FINISHING COLOR MODE TWO-SIDED/ONE-SIDED SHEET SIZE | |
| 1 | PRINTER 1 | 192.168.111.111 | READY TO PRINT | ... | ... | ... | ... | 128 MByte |
| 2 | PRINTER 2 | printer2.example0.jp | NO SHEETS | | | | | ... |
| 3 | | | | | | | | |

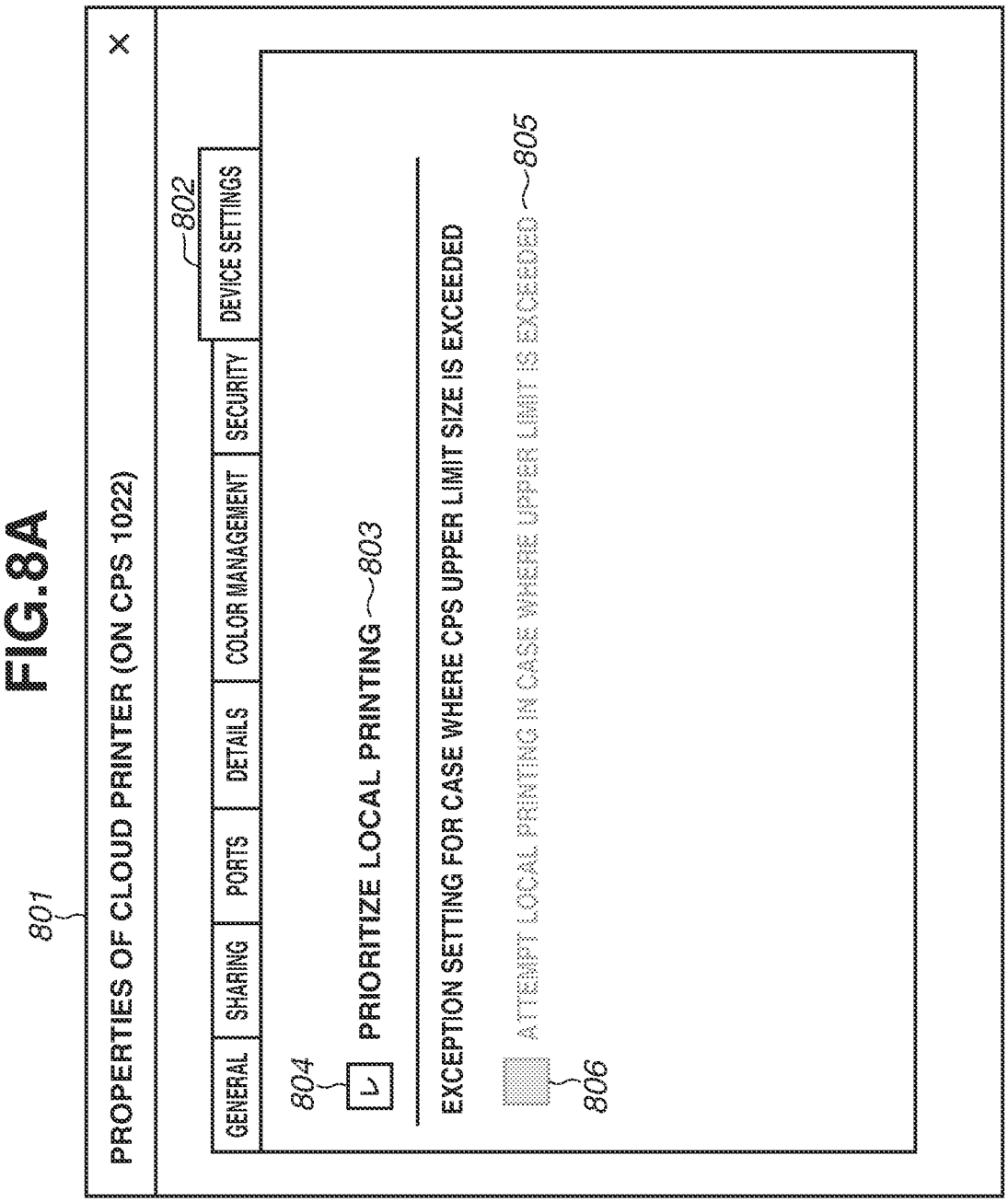

FIG. 8B

PROPERTIES OF CLOUD PRINTER (ON CPS 1022)

| GENERAL | SHARING | PORTS | DETAILS | COLOR MANAGEMENT | SECURITY | DEVICE SETTINGS |

☐ 814 PRIORITIZE LOCAL PRINTING

EXCEPTION SETTING FOR CASE WHERE CPS UPPER LIMIT SIZE IS EXCEEDED

☐ 815 ATTEMPT LOCAL PRINTING IN CASE WHERE UPPER LIMIT IS EXCEEDED

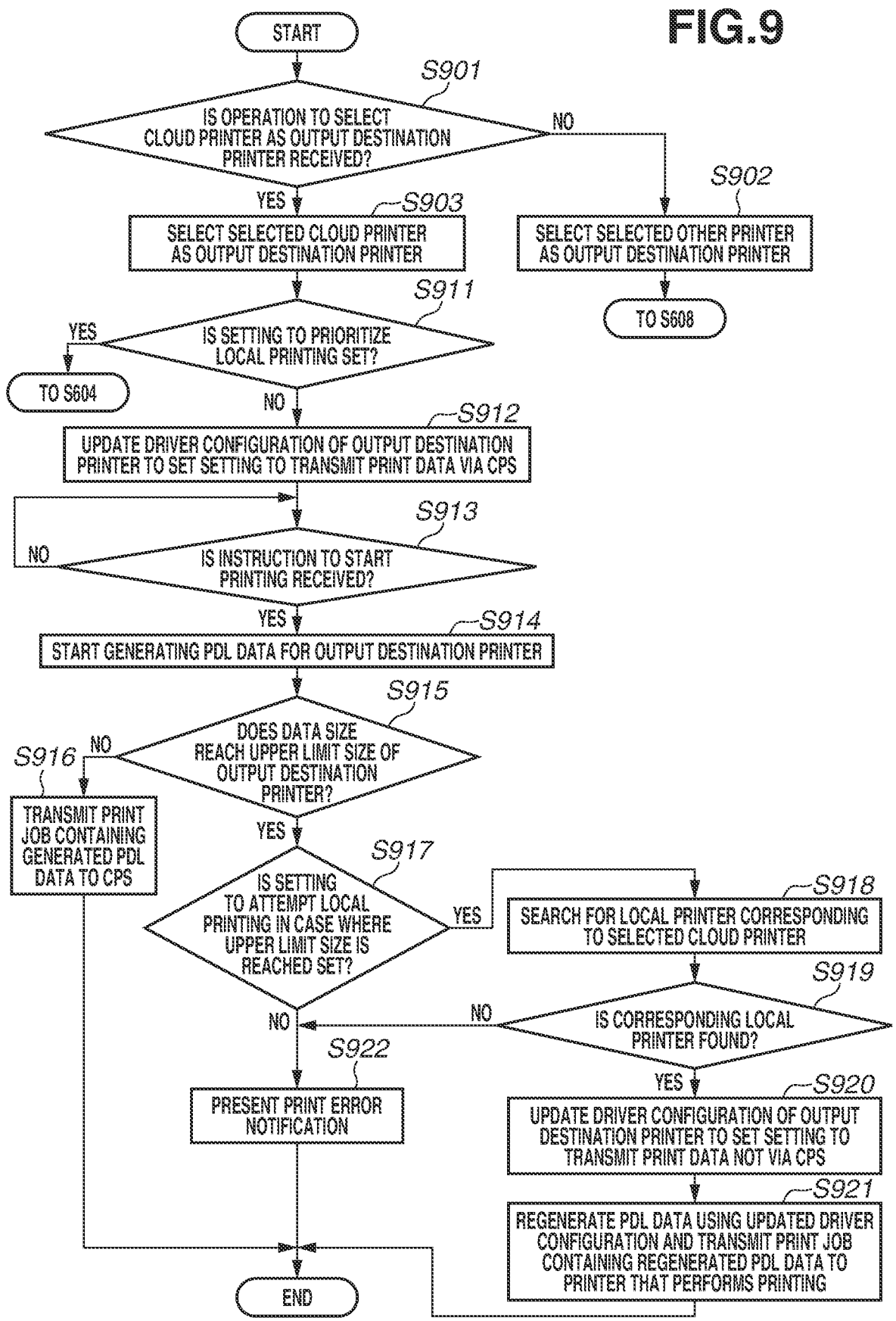

INFORMATION PROCESSING APPARATUS, CONTROL METHOD, AND STORAGE MEDIUM

BACKGROUND

Field of the Disclosure

The present disclosure relates to an information processing apparatus configured to transmit print data, a control method, and a storage medium.

Description of the Related Art

A configuration that transmits print data to a printer using a print client such as a printer driver is generally known. An operating system (OS), which is basic software, is installed in an information processing apparatus, and the print client, such as a printer driver, is called by the OS and operates.

Further, in these days, a cloud print system in which a print job is input via the cloud and transmitted to a printer is widely used (Japanese Patent Application Laid-Open No. 2012-133489). In the printing system, first, an administrator registers the printer in a cloud print service (hereinafter, also referred to as "CPS"). Then, a user allowed to use the CPS selects the printer registered in the CPS as an output printer, performs desired print settings, and transmits a print job to the CPS. The CPS having received the print job transfers the print job to the selected output printer. The printer executes printing based on the transferred print job.

In printing via a cloud print service, a print job is transmitted via the cloud. This produces an advantage that a user can print easily from an information processing apparatus such as a smartphone or a tablet terminal using a mobile communication network even when the user is staying out.

SUMMARY

According to embodiments of the present disclosure, an information processing apparatus configured to communicate with a cloud print service includes at least one memory that stores a set of instructions, and at least one processor that executes the instructions, the instructions, when executed, causing the information processing apparatus to perform operations including determining whether transmission of a print job to a printer associated with a cloud printer not via the cloud print service is allowed in a case where the cloud printer on the cloud print service is selected as an output destination, and transmitting the print job to the printer associated with the cloud printer through a path not via the cloud print service in a case where it is determined that transmission of the print job to the printer associated with the cloud printer not via the cloud print service is allowed.

Further features of the present disclosure will become apparent from the following description of exemplary embodiments with reference to the attached drawings.

BRIEF DESCRIPTION OF THE DRAWINGS

FIG. 7 is a table describing printers registered in a cloud print service (CPS).

FIGS. 8A and 8B illustrate an example of a setting screen displayed on an operation unit according to a second exemplary embodiment.

FIG. 9 is a flowchart illustrating an example of a process of printing by an information processing apparatus according to the second exemplary embodiment.

DESCRIPTION OF THE EMBODIMENTS

Various exemplary embodiments of the present disclosure will be described below with reference to the drawings. It should be noted that the following exemplary embodiments are not intended to limit the scope of the disclosure and that not all combinations of features described in the exemplary embodiments are always essential to a technical solution of the disclosure.

As described above, a cloud print service (CPS) transmits a print job via the cloud. This produces an advantage that a user can print easily from an information processing apparatus such as a smartphone or a tablet terminal using a mobile communication network even when the user is outside.

Meanwhile, there is a case where a printer from which the user is to obtain a final print is accessible via a local network depending on a network environment of the information processing apparatus not via the CPS. For example, when the user is in an office of the user, the user can access the printer by connecting the information processing apparatus to a local network of the office.

If the CPS is used even in a case where printing can be executed via a local network, the investment for cloud resources is needed to process huge amounts of printing, and this increases costs. Furthermore, a processing delay may occur unless the resources are increased.

Thus, employing the configuration that executes printing via the cloud print service even in a case where printing can be executed via the local network increases the cost of maintaining the cloud resources of a provider of the cloud print service.

Thus, in a first exemplary embodiment, a system is provided in which whether transmission of a print job to a printer associated with a cloud printer of a CPS not via the CPS is allowed is determined and the print job is transmitted through a path not via the CPS based on a result of the determination. A specific example thereof will be described.

Figure 1:
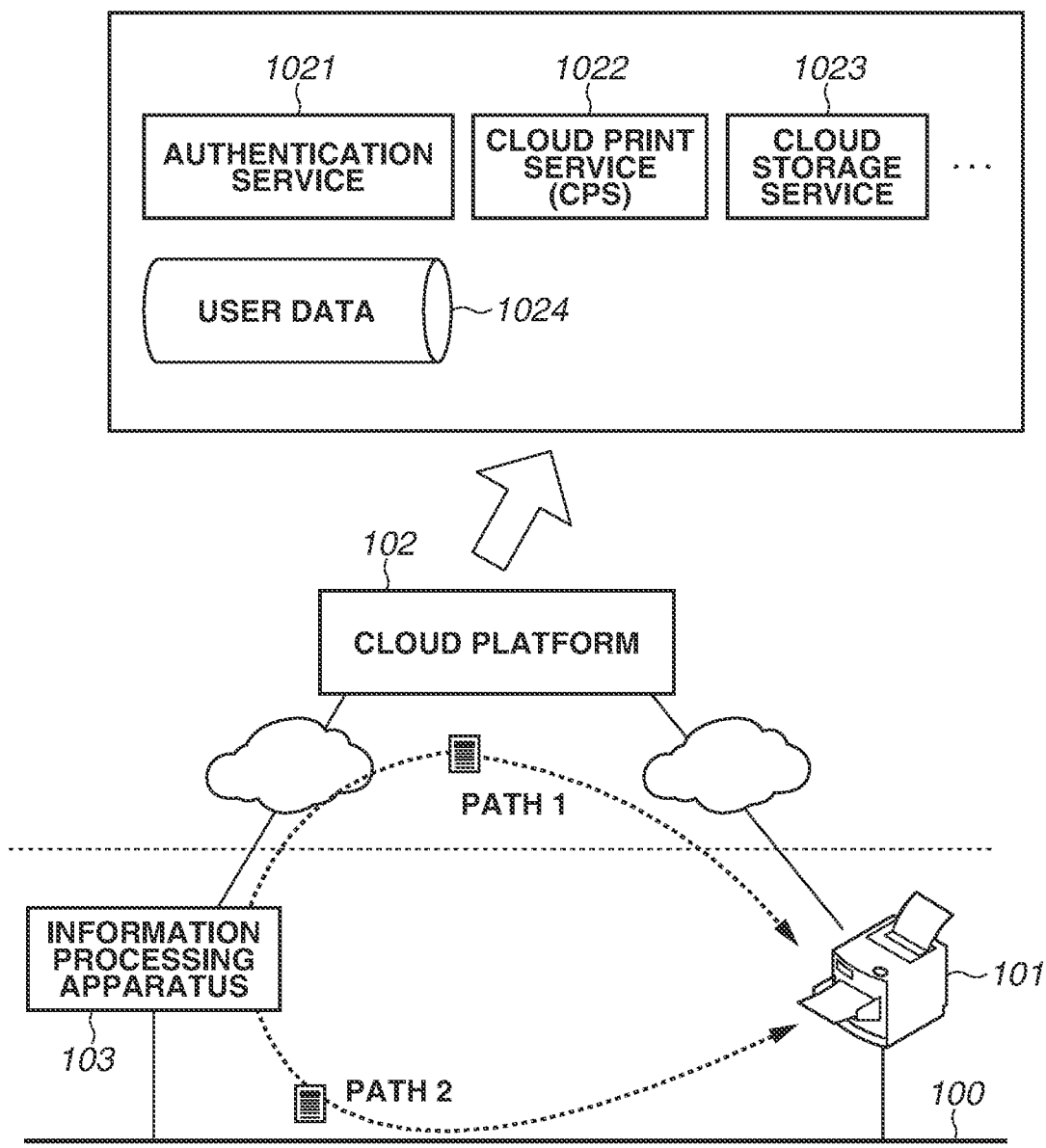
FIG. 1 is a block diagram illustrating an example of a printing system.

First, a configuration of a printing system according to the present exemplary embodiment will be described with reference to FIG. 1. The printing system according to the present exemplary embodiment includes a multi-function peripheral (MFP) 101, a cloud platform 102, and an information processing apparatus 103. The cloud platform 102 provides a cloud print service (hereinafter, referred to as "CPS") 1022 and a cloud storage service 1023. In the present exemplary embodiment, the CPS 1022 is provided as a service on a cloud platform such as Amazon Web Services (AWS®), Azure®, or Google Cloud Platform®.

The information processing apparatus 103 can also belong to a local area network 100.

In the present exemplary embodiment, a case where the information processing apparatus 103 is a portable device such as a laptop, a tablet terminal, or a smartphone is assumed. The present exemplary embodiment is not limited thereto and is also applicable to the print control that uses a smartwatch, smart glasses, or a virtual reality (VR) headset device.

There is a case where the information processing apparatus 103 is connected to the local area network 100 of a company or organization and is used in works and activities in the company or organization. There is also a case where the information processing apparatus 103 is used outside the company or organization. In this case, the information processing apparatus 103 may be connected to a public wireless line or other networks but may not be able to communicate directly with the MFP 101 connected to an internal network provided with a firewall in the company or organization.

The MFP 101 communicates with the information processing apparatus 103 and the CPS 1022 provided by the cloud platform 102 via a network. In the present exemplary embodiment, a state where the MFP 101 is registered as an output printer under the CPS 1022 is described as an example.

Next, printing via the CPS 1022 will be described. A user allowed to use the CPS 1022 operates the information processing apparatus 103 and selects a printer registered in the CPS 1022 as an output printer. After selecting the output printer, the user makes desired print settings via a print setting screen (not illustrated). Then, the user issues a print start instruction and transmits a print job to the CPS 1022. After receiving the print job, the CPS 1022 transfers the print job to the printer. The printer executes printing based on the transferred print job. With such a system, printing is executed through a communication path specified as a path 1 in FIG. 1.

Meanwhile, there is a case where the information processing apparatus 103 can access a printer such as the MFP 101 from which the user is to obtain a final print is accessible not via the CPS 1022 but via a local network depending on a network environment of the information processing apparatus 103. For example, in a case where the information processing apparatus 103 is connected to the local area network 100, the information processing apparatus 103 can communicate with the MFP 101 through a path 2 via the local area network 100.

Further, there is a case where the information processing apparatus 103 can access the printer from which the user is to obtain a final print not via the CPS 1022 but via the local network depending on the network environment of the information processing apparatus 103.

If the CPS 1022 is used even in a case where printing can be executed via the local network, the investment for cloud resources is needed to execute printing, and this increases costs. Furthermore, a processing delay may occur unless the resources are increased.

In this case, the following issue arises. Specifically, although there is the path 2 through which data for printing can be transferred without consuming the cloud resources, printing is executed via the cloud, and this increases the cost of maintaining the cloud resources of a provider of the cloud print service.

The present exemplary embodiment provides a system that solves at least one of the above-described issues. The present exemplary embodiment provides a system configured to transmit a print job not via the CPS 1022 in a case where an output printer (also referred to as "cloud printer") on the CPS 1022 is selected and a local printer corresponding to the output printer is accessible not via the CPS 1022. The system will be described specifically. The local printer is an apparatus that includes a hardware resource configured to print an image on a sheet (e.g., a print engine that prints an image on a sheet using an electrophotographic method or an inkjet method). Further, the output printer or the cloud printer on the CPS 1022 is a virtual printer that transfers data to the local printer registered in the CPS 1022 and is managed on the CPS 1022.

The MFP 101 includes a scan function, a print function, and a copy function. The scan function is a function of reading a document using a scanner to obtain image data and externally transmitting the obtained image data. The print function is a function of printing an image on a sheet such as paper based on a print job received from an external apparatus. Further, the MFP 101 can receive a print job via the CPS 1022 and execute printing. While the MFP 101 with the plurality of functions is described as an example of a printing apparatus in the present exemplary embodiment, the present exemplary embodiment is not limited thereto.

For example, the printing apparatus can be a single-function printing apparatus that includes only the print function. Further, the printing apparatus can be a print server that transfers received print data to a printer under the print server.

A network for communication through the path 1 via the CPS 1022 may be a combination of a communication network such as a local area network (LAN) or a wide area network (WAN), a cellular network (e.g., Long Term Evolution (LTE) network, $5^{th}$ Generation (5G) network), and an Institute of Electrical and Electronics Engineers (IEEE) 802.11 wireless network. Thus, the network for communication through the path 1 may be configured to transmit and receive data, and any method can be employed as a communication method for a physical layer.

Next, the cloud services provided to a customer by the cloud platform 102 will be described. The cloud platform 102 is a service platform that provides the CPS 1022, the cloud storage service 1023, a webmail, and a service for generating and editing a document to an organization such as a company. Further, the cloud platform 102 also includes an authentication service 1021 configured to authenticate and manage users and devices that use various services.

The authentication service 1021 authenticates and manages users, user groups, and devices for each tenant. The cloud platform 102 manages rights to use the cloud services and manages access to customer data for each tenant. As used herein, the term "tenant" refers to a unit of use of the cloud platform 102. More specifically, a different tenant is assigned to each organization (e.g., for each company or organization) with a contract to use the cloud service platform. A virtual printer object of the CPS 1022 is also managed for each tenant. More specifically, user data 1024 including print data, data for implementing the CPS 1022, and a user database (user DB) for user authentication is managed for each tenant.

The virtual printer object is a software module that provides a function of temporarily spooling an externally-received print job and a function of transferring the spooled print job to a subsequent print control apparatus such as the MFP 101.

The CPS 1022 receives a print job from a print client such as the information processing apparatus 103 and passes the print job to the corresponding virtual printer object. The virtual printer object stores the print job in a spool area managed by the virtual printer object. Then, the virtual printer object notifies the MFP 101 registered in the CPS 1022 that the print job is submitted. After receiving the notification, the MFP 101 acquires the print job from the spool area of the virtual printer object and executes printing based on the acquired print job.

The information processing apparatus 103 includes a shared printer driver that is a print client for printing via the CPS 1022. The information processing apparatus 103 also includes a function of transmitting print data directly to a local printer corresponding to an output printer on the CPS 1022 and causing the local printer to print the print data in a case where the information processing apparatus 103 can communicate with the local printer via the local area network 100. Hereinafter, the function will be also referred to as "local cloud print function". Details thereof will be described below.

<Configuration of MFP>

Figure 2:
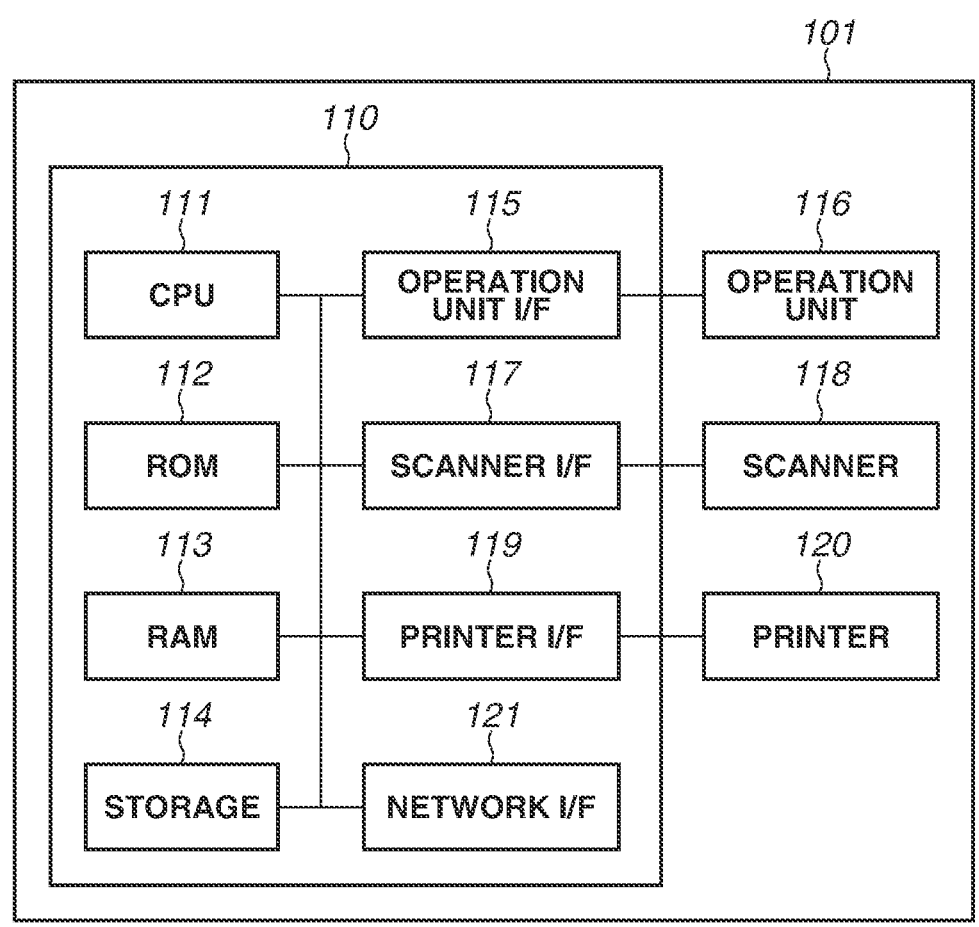
FIG. 2 is a block diagram illustrating an example of a hardware configuration of a multi-function peripheral (MFP) 101.

Next, a hardware configuration of the MFP 101 as an example of a print control apparatus according to the present exemplary embodiment will be described with reference to FIG. 2. FIG. 2 is a block diagram illustrating a hardware configuration of the MFP 101.

A control unit 110 including a CPU 111 controls operations of the entire MFP 101. The CPU 111 reads a control program stored in a read-only memory (ROM) 112 or a storage 114 and performs various types of control such as a print control and a reading control. The ROM 112 stores control programs executable by the CPU 111. A random access memory (RAM) 113 is a main storage memory that the CPU 111 accesses. The RAM 113 is used as a work area or a temporary storage area for loading various control programs. The storage 114 stores a print job, image data, various programs, and various types of setting information. The CPU 111, the ROM 112, the RAM 113, and the storage 114 (hardware) form a so-called computer. The storage 114 also stores access tokens for access to resources of the user tenants on the cloud platform 102 and stores address information for use in communication with the CPS 1022.

While the single CPU 111 controls printing and communication with the CPS 1022 using a single memory (RAM 113) in the MFP 101 according to the present exemplary embodiment, a different form may be employed. For example, a plurality of processors, a plurality of memories, and a plurality of storages can be configured to cooperate with each other to perform processing described below. Further, a hardware circuit may be employed to perform part of the processing.

A printer interface (I/F) 119 connects a printer 120 (printer engine) and the control unit 110. The MFP 101 generates a print image and a print control command that are to be transferred to the printer 120 based on a print job received from the CPS 1022 or the information processing apparatus 103. The printer 120 prints an image on a sheet fed from a sheet feeding cassette (not illustrated) based on the print image and the print control command that are input via the printer I/F 119. The printing may be executed using an electrophotographic method, in which toner is transferred onto a sheet and fixed to the sheet, or an inkjet method, in which ink is discharged onto a sheet.

A scanner I/F 117 connects a scanner 118 and the control unit 110. The scanner 118 reads a document placed on a platen glass (not illustrated) and generates image data. The image data generated by the scanner 118 is printed by the printer 120, stored in the storage 114, and/or transmitted to an external apparatus via a network I/F 121.

An operation unit I/F 115 connects an operation unit 116 and the control unit 110. The operation unit 116 includes a liquid crystal display unit including a touch panel function and various hardware keys. The operation unit 116 functions as a display unit that displays information to a user and as a reception unit that receives user instructions. The CPU 111 cooperates with the operation unit 116 to control the display of information and the reception of user operations.

The network I/F 121 is connected with a network cable and can communicate with an external apparatus on the local area network 100 or the Internet. In the present exemplary embodiment, a case where the network I/F 121 is a communication interface that connects a wired cable in the form of an RJ45 connector or a GigaGate 45 (GG45) connector and performs Ethernet® wired communication is assumed. The network I/F 121 is not limited thereto. For example, the network I/F 121 may be an IEEE 802.11 series wireless communication interface. Further, another communication interface for communication through the path 2 may be included. In this case, the communication interface may be a communication interface that performs mobile communication such as $3^{rd}$ generation (3G) line, e.g., code-division multiple access (CDMA), $4^{th}$ generation (4G) line, e.g., Long Term Evolution (LTE), or $5^{th}$ generation (5G) new radio (NR) mobile communication.

After receiving the notification of submission of the print job from the CPS 1022, the MFP 101 receives the print job from the CPS 1022. Then, the MFP 101 renders page description language (PDL) data contained in the print job and generates image data for printing. The CPU 111 transmits the rendered print image data and a control command for controlling the printer 120 to the printer 120 via a printer I/F 119 and causes the printer 120 to execute printing processing.

Further, the MFP 101 supports a standard print function such as the Internet Printing Protocol (IPP). Upon receiving a printer search packet using the multicast Domain Name System (mDNS) from an external apparatus such as the information processing apparatus 103, the MFP 101 transmits a response with a search result to the packet. The search result contains identification information for identifying the printer.

Next, a hardware configuration of the information processing apparatus 103 will be described with reference to FIG. 3. A control unit 130 including a CPU 131 controls operations of the entire computer. The CPU 131 performs various types of control by loading a program stored in a ROM 132 or a storage 134 to a RAM 133 and executing the loaded program. The RAM 133 is a main storage memory of the CPU 131 and is used as a work area or a temporary storage area for loading various programs. The ROM 132 stores control programs and boot programs that are executable by the CPU 131.

While a case where the storage 134 is an auxiliary storage apparatus such as a hard disk drive (HDD) is assumed in the present exemplary embodiment, a non-volatile memory such as a solid state drive (SSD) may be used in place of the HDD. The CPU 131, the RAM 133, the ROM 132, and the storage 134 (hardware) form a so-called computer as described above.

An operation unit I/F 136 is an interface that controls an operation unit 137 such as a keyboard, a pointing device (mouse), a touch input device, and a display. The operation unit 137 functions as a reception unit that receives user operations. Further, the operation unit 137 functions as a display unit that displays information to the user. The information processing apparatus 103 is connected to the network or the Internet via a network I/F 140. The information processing apparatus 103 transmits print data to the printing apparatus on the local area network 100 via the network I/F 140 and communicates data with the cloud platform 102 on the Internet. A method for the communication can be IEEE 802.11 series wireless communication or wired communication by connecting to the Ethernet® via a wired cable connected in the form of the RJ45 connector or the GG45 connector. Data communication with the cloud platform 102 on the Internet can be performed via the LTE or the 5G mobile communication system.

While the single CPU 131 performs a process illustrated in a flowchart described below using a single memory (RAM 133) in the information processing apparatus 103 according to the present exemplary embodiment, a different form may be employed. For example, a plurality of processors, a plurality of memories, and a plurality of storages may be configured to cooperate with each other to perform processing described below. Further, a hardware circuit may be used to perform part of the processing.

Figure 3:
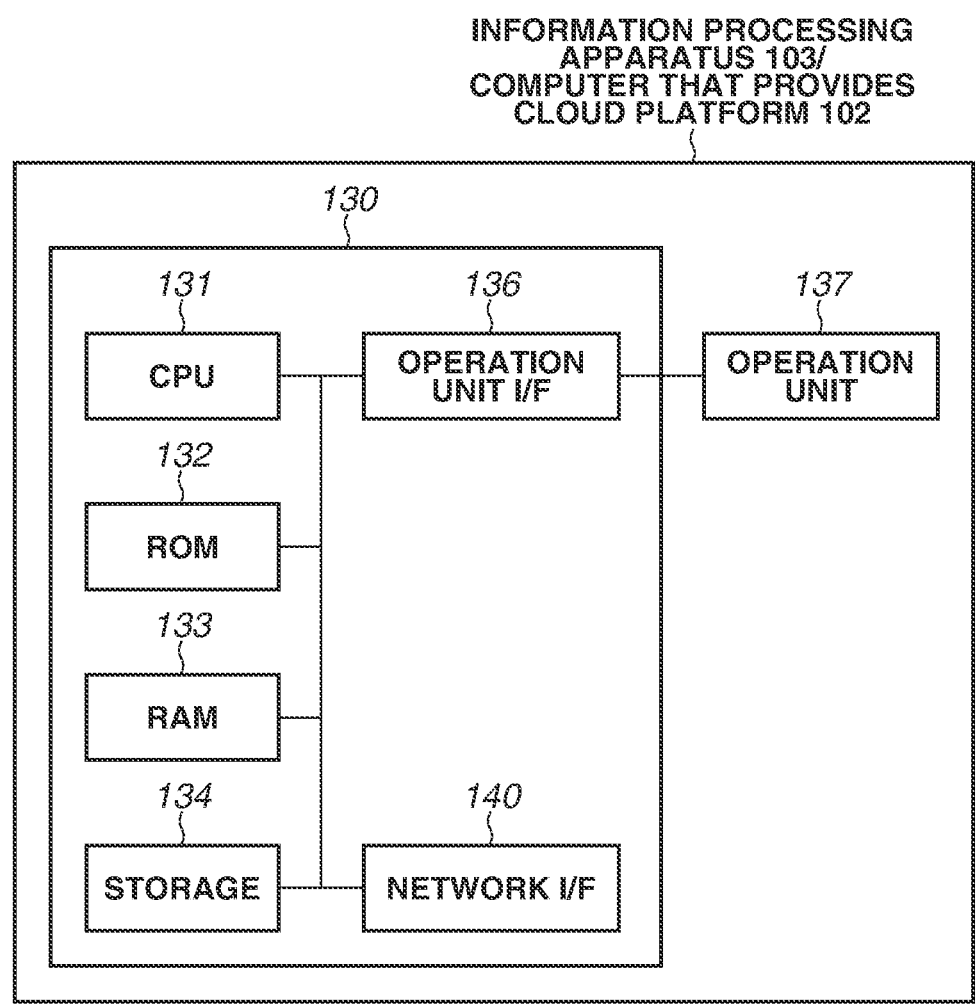
FIG. 3 is a block diagram illustrating an example of a hardware configuration of a computer.

A computer as a real resource that achieves each cloud service of the cloud platform 102 has a configuration similar to the hardware configuration illustrated in FIG. 3. In other words, each cloud service illustrated in FIG. 1 is achieved by a so-called von Neumann model computer by executing program codes.

Further, while a case where a single CPU performs each process of each cloud service of the cloud platform 102 using a single memory is described as an example in the present exemplary embodiment for simplification of description, a different form may be employed. For example, a plurality of processors, a plurality of RAMs, a plurality of ROMs, and a plurality of storages can cooperate with each other to perform processing illustrated in a flowchart described below. Further, resources of a plurality of server computers can cooperate with each other to achieve the services. The computer resources that provide the cloud platform 102 use a containerization technique and a virtualization technique as needed to manage data resources of a plurality of different tenants as appropriate and to provide cloud services to users of the tenants.

<Software Configuration of Information Processing Apparatus 103>

Figure 4:
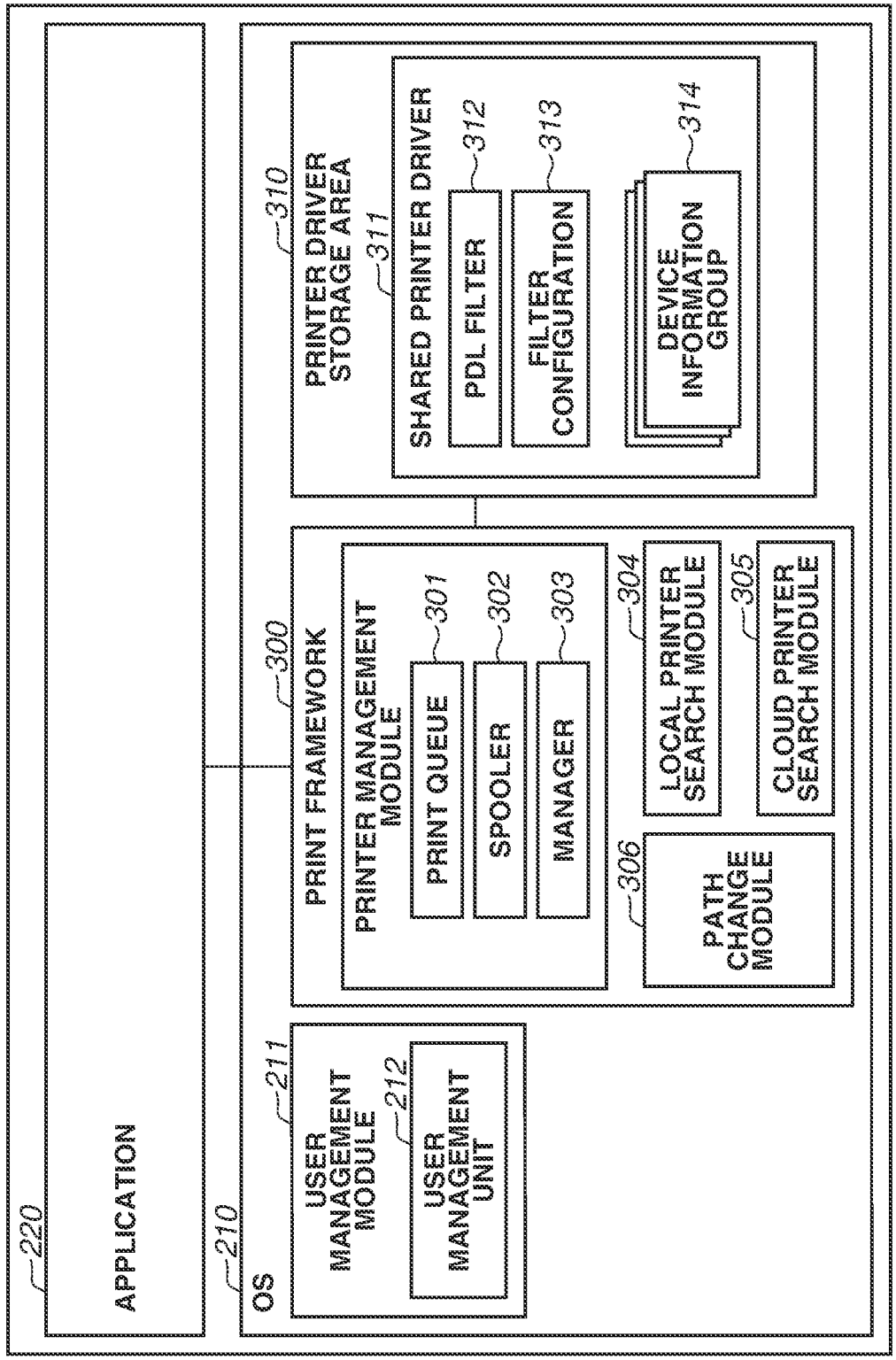
FIG. 4 is a block diagram illustrating an example of a software configuration of an information processing apparatus 103.

Next, an example of a software configuration of the information processing apparatus 103 will be described below with reference to FIG. 4. First, operating software in the information processing apparatus 103 will be described. The software in the information processing apparatus 103 includes an operating system (OS) 210 and an application 220.

Fist, components of the OS 210 will be described. The OS 210 is system software that comprehensively controls the entire information processing apparatus 103. More specifically, the OS 210 provides a basic computer management/control such as an input/output control, a management of hardware such as memories and hard disks, and process management. Further, the OS 210 according to the present exemplary embodiment includes a user management module 211 and a print framework 300. The user management module 211 manages user accounts of the cloud platform 102. A user management unit 212 stores access tokens that are information about the user accounts of the cloud platform 102. In the present exemplary embodiment, a case where the information processing apparatus 103 is authenticated by the authentication service 1021 of the cloud platform 102 and is under device management, is described as an example. Further, login authentication of a user to use the information processing apparatus 103 is performed in cooperation with the authentication service 1021 of the cloud platform 102. Hereinafter, a case where the user "Alice" logs in the information processing apparatus 103 with the cloud account "aaaAlice@company A.example0.jp" will be described as an example below for explanation.

The print framework 300 includes a print queue 301, a spooler 302, a manager 303, a local printer search module 304, and a cloud printer search module 305. Further, the print framework 300 generates PDL data in cooperation with a printer driver stored in a printer driver storage area 310. In the present exemplary embodiment, a case where the shared printer driver 311 for printing via the CPS 1022 is pre-installed in the OS 210 is described as an example. Further, the printer driver storage area 310 stores a vendor-provided printer driver installed in the information processing apparatus 103 by a user operation.

The print queue 301 is an area for temporarily storing a print job when printing is performed, and there can be a plurality of print queues 301. In the present exemplary embodiment, for explanation, the print queue 301 for use in transmitting print data to a cloud printer managed on the CPS 1022 via the CPS 1022 is generated. The spooler 302 is a module that temporarily stores and manages an Extensible Markup Language (XML) Paper Specification (XPS) file that is print target data generated by the application 220. The XPS file stored in the spooler 302 is converted into a PDL file using a PDL filter. A print job containing the PDL file obtained as a result of the conversion and a print setting file in a format such as PrintTicket is stored in the spooler 302. The print job is transmitted to the CPS 1022 or the printing apparatus through the spooler 302.

The manager 303 is a module that provides the function of configuring a filter pipeline, generating print data using the configured pipeline, generating print settings, and making changes. First, the configuring of the filter pipeline will be described below. The manager 303 loads one or more PDL filters 312 stored in the printer driver storage area 310 and configures a filter pipeline module that converts an XPS file into a PDL file. More specifically, the manager 303 identifies a printer driver corresponding to an output destination printer. In the present exemplary embodiment, a case where a cloud printer managed by the CPS 1022 is selected as an output destination printer and the shared printer driver 311 is identified as the printer driver corresponding to the output destination printer will be described.

The manager 303 reads one or more PDL filters 312, which are a component of the shared printer driver 311, and configures the filter pipeline module based on a filter configuration 313 of the identified printer driver. Next, when a user operation to start printing is detected, the OS 210 converts XPS data into PDL data using one or more PDL filters 312 loaded to the filter pipeline module. For example, Printer Control Language (PCL) or Portable Document Format (PDF) can be employed as PDL.

Next, the print setting management will be described. The manager 303 manages PrintCapabilities, which is capability information about the output destination printer, and PrintTicket, which specifies the print settings to be applied in printing. The shared printer driver 311 provides to the print framework 300 a device information group 314 describing device functions. The device information is stored separately for each cloud printer. The manager 303 identifies the user-selected output destination printer and acquires the corresponding device information from the device information group 314. Then, the manager 303 provides the print setting screen customized for each output destination device based on the device information.

The local printer search module 304 is a module that searches for a printer on the local area network 100 to which the information processing apparatus 103 is connected. The local printer search module 304 is used in a case where a search for a new printer is performed on a search screen (not illustrated) or in a case where a search for a local printer corresponding to a cloud printer is performed in a flowchart described below. The local printer search module 304 searches for a network printer by, for example, broadcasting a broadcast packet for searching such as an mDNS packet on the network. Further, the local printer search module 304 can search for a network printer by, for example, unicast communication using an Internet Printing Protocol (IPP) Get-Printer-Attributes Request.

The cloud printer search module 305 is a module that searches for a cloud printer located on the CPS 1022. The cloud printer search module 305 is used in a case where a user operation to display the search screen (not illustrated) is received and a search for a new printer is performed. Further, the cloud printer search module 305 is used in updating a cloud printer on the CPS 1022 that can be used by the user at a user login or a recovery from sleep. The cloud printer search module 305 acquires an access token corresponding to the login user from the user management module 211. Then, the cloud printer search module 305 calls using the access token a web application programming interface (web API) for printer search that is provided by the CPS 1022. Upon receiving the call for the web API, the CPS 1022 identifies a tenant based on the access token and responds with information about the cloud printer associated with the tenant. For example, in a case where the CPS 1022 receives a search request containing an access token corresponding to the account "aaaAlice@company A.example1.jp", the CPS 1022 transmits a notification of a list of printers associated with the tenant "company A".

FIG. 7 illustrates an example of cloud printer information that is managed by the CPS 1022 and is associated with the tenant "company A". Information 702 specifies a printer name that is identification information for identifying the cloud printer on the CPS 1022. Further, information 703 specifies a uniform resource identifier (URI) of the printer that is to process a print job submitted to the CPS 1022.

Information 704 specifies a printer status, and information 705 specifies a printer location. Information 706 is metadata for use in displaying detailed device information. Information 707 specifies whether the printer is shared with a user group. Information 708 specifies capability information about the cloud printer that is to be notified to a printer client such as the information processing apparatus 103. More specifically, the information 708 includes capability information about a finishing function such as stapling, a supported color mode, and capability information about whether two-sided printing is supported. Further, the information 708 stores information about a supported sheet size. Information 709 stores PDL data size information that the cloud printer can receive. For example, the information 709 is information that corresponds to the pdf-k-octets-supported attribute defined in the Printer Working Group (PWG) 5100.16.

Referring back to FIG. 4, the OS 210 displays a search result on the search screen (not illustrated). The search screen displays various output destinations found by a local search or a cloud search. In a case where a user operation to select a cloud printer found by a search as an output destination printer is received, the manager 303 cooperates with the cloud printer search module 305 to acquire the capability information about the selected cloud printer. To acquire the capability information, for example, an IPP Get-Printer-Attribute Request can be used. The CPS 1022 having received a capability information acquisition request responds to the manager 303 with the various types of information described above with reference to FIG. 7. The manager 303 having received the response stores the capability information about the cloud printer in the device information group 314 of the shared printer driver 311 based on the response.

A path change module 306 provides the function of determining whether printing through a path (path 2) not via the CPS 1022 is allowed and the function of changing a path. In a case where the path change module 306 determines to change the path, the path change module 306 changes the setting of the output destination of the print queue 301 to change the output destination from the CPS 1022 to the URI (the Internet Protocol (IP) address and the host name for access to the local printer) of the local printer. Details of the changing will be described below with reference to a flowchart described below.

<Printing Sequence>

Figure 5:
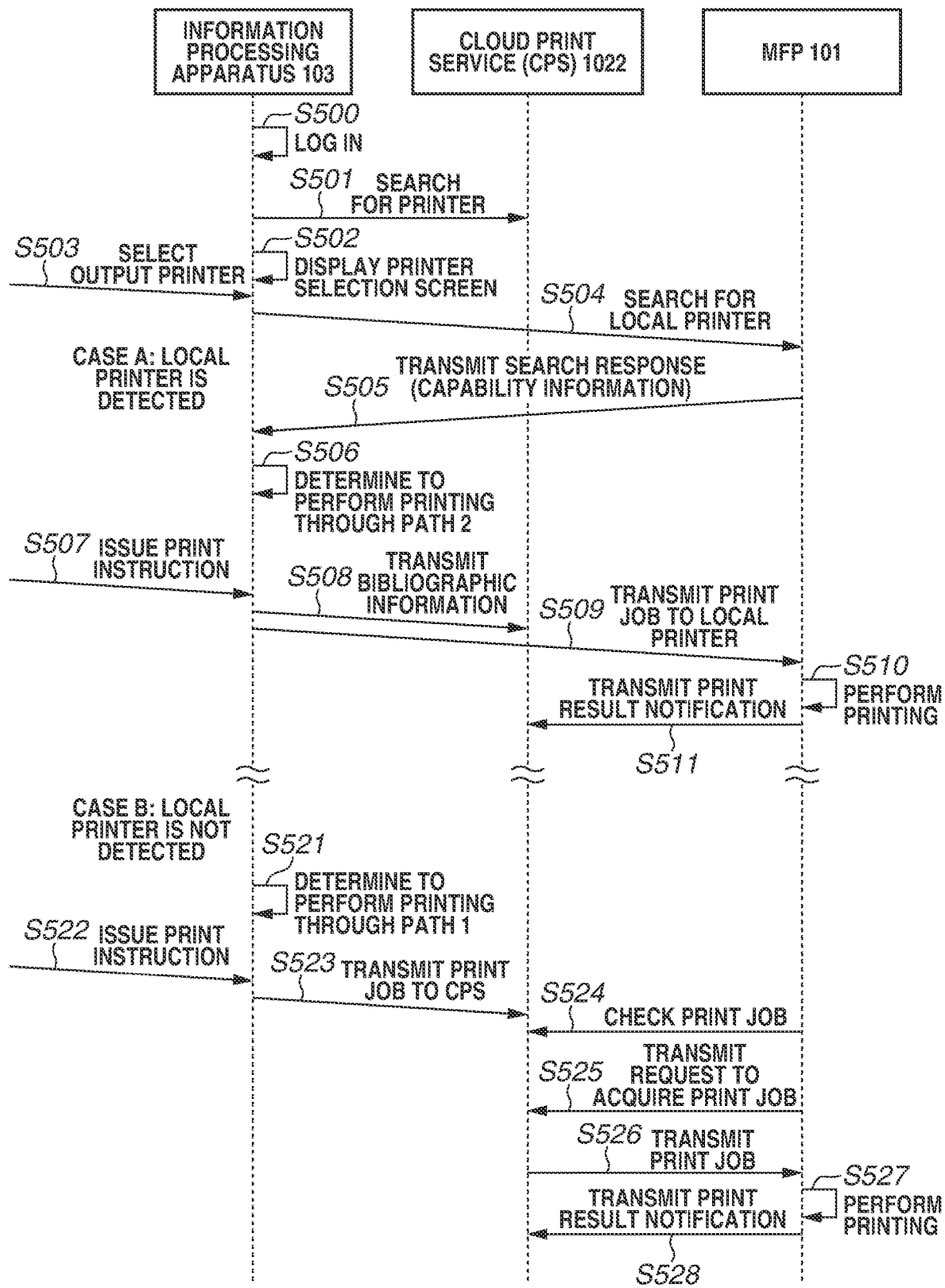
FIG. 5 is a sequence diagram illustrating an example of a print sequence using a printing system.

Next, a sequence of printing by "Alice" using the information processing apparatus 103 will be described with reference to FIG. 5. First, in step S500, "Alice" logs into the information processing apparatus 103 using the user account of the cloud platform 102. As login information, "Alice@company A.example0.jp" and the corresponding password are used.

Next, in step S501, the manager 303 of the OS 210 cooperates with the cloud printer search module 305 to transmit to the CPS 1022 a printer search request containing an access token corresponding to the login user "Alice". The manager 303 having received information about the cloud printer that the user can use as a result of the search request temporarily stores the search result information in the RAM 133. The search result contains at least the printer name information and the URI information about the local printer that are described above with reference to FIG. 7.

Next, in step S502, upon receiving an instruction to print document data or image data via the application 220, the OS 210 cooperates with the manager 303 to display a printer selection screen. The printer selection screen displays a display item corresponding to a printer configured to execute printing using a vendor-provided printer driver installed in the information processing apparatus 103 and a display item corresponding to a cloud printer found as a result of the search processing in step S501.

In step S503, the OS 210 receives an operation to select an output destination printer via the printer selection screen. For explanation, a case where a cloud printer managed on the CPS 1022 is selected as an output destination printer on the selection screen will be described. Next, in step S504, the manager 303 searches for a local printer on the local area network 100.

For example, the manager 303 searches for a network printer using unicast communication such as an IPP Get-Printer-Attributes Request in cooperation with the local printer search module 304. In this case, information (i.e., the IP address and the host name of the local printer) that specifies the URI of the local printer corresponding to the cloud printer is designated as a search packet destination. For example, in a case where the cloud printer specified as "printer 1" in FIG. 7 is selected as an output destination printer, "192.168.111.111" is designated as a search packet destination. The search method is an example. Further, a unicast printer search may be performed using the Simple Network Management Protocol (SNMP).

Further, the search method is not limited to the unicast search. For example, there is a case where the CPS 1022 is designed to notify not a URI of a local printer but a device ID that uniquely identifies a local printer associated with a cloud printer. The device ID is, for example, a Universally Unique Identifier (UUID) that uniquely identifies a device.

In this case, it is difficult to search for a local printer on the network using unicast communication. In this case, for example, an mDNS search packet can be broadcasted on the network to search for a local printer on the network. In this case, a plurality of local printers on the network is found. The manager 303 compares the UUIDs of the printers found as a result of the search and the UUID of the local printer associated with the cloud printer that is notified by the CPS 1022, and determines whether a local printer corresponding to the output destination printer is found.

<Case A: Print Control in a Case Where Local Printer is Found>

Next, the print control in a case where a local printer is detected as a result of the search processing in step S504 will be described with reference to steps S505 to S511.

In a case where a local printer corresponding to the output destination printer is detected as a result of the search in step S504, in step S505, the manager 303 acquires the capability information about the local printer. In a case where an IPP Get-Printer-Attributes Request is used in the search in step S504, the capability information is acquired from the MFP 101 as a response to the search. In a case where the local printer corresponding to the output destination printer is found using the mDNS or SNMP, the manager 303 transmits to the found printer a unicast request to acquire the capability information and acquires the capability information about the local printer as a response to the request.

Next, in step S506, the manager 303 determines to execute printing through the path 2 and updates the various settings. More specifically, the PrintCapabilities indicating the capabilities of the output destination printer and the PrintTicket indicating the print settings to be applied in printing are updated with the acquired capability information. Further, the filter pipeline module is re-configured as needed. For example, in a case where the local printer does not support PDF as a PDL data format, a filter for raster conversion is acquired from the PDL filter 312, and the filter pipeline module is reconfigured. This processing updates a filter state to perform rendering using a raster method (e.g., PWG-Raster method). Further, the manager 303 cooperates with the path change module 306 to change the output destination setting of the print queue 301 to the URI (the IP address and the host name for access to the local printer) of the local printer.

As a result of the changing processing in step S506, the print setting screen that is suitable for the capabilities supported by the local printer can be presented as appropriate, and a PDL format that can be supported by the local printer is selected as appropriate. Further, as a result of the changing processing in step S506, the output destination of print data can be changed to the local printer.

Next, the user performs an operation to execute printing. In step S507, in a case where the OS 210 detects the user operation to execute printing, a transmission control is in steps S508 and S509 is performed.

First, in step S508, the manager 303 of the OS 210 transmits bibliographic information about the print job to the CPS 1022. The bibliographic information contains information about the print settings, the name of the job, and the name of the owner of the job. Further, the bibliographic information contains information indicating that printing is to be performed through the local cloud print path (path 2 in FIG. 1). Based on the reception of the bibliographic information, the CPS 1022 recognizes that local printing is executed. The CPS 1022 having received the bibliographic information issues a job ID and responds to the information processing apparatus 103 with the job ID. While a case where the control is performed to transmit the bibliographic information to the CPS 1022 in printing through the path specified by the path 2 is described as an example in the present exemplary embodiment, it is not limited thereto. The configuration can be designed not to transmit the bibliographic information to the CPS 1022 in a case where the setting is changed to execute printing through the path 2.

Next, the manager 303 converts drawing data received from the application 220 via the spooler 302 into PDL data using the configured filter pipeline module. Then, the manager 303 generates a print job containing the PDL data and the print setting information and stores the generated print job in the print queue 301. The output destination of the print job stored in the print queue 301 is changed to the local printer as a result of the changing processing in step S506.

In step S509, the OS 210 transmits the print job data stored in the print queue 301 to the local printer based on the changed output destination setting. The print job also contains information indicating that printing is to be executed through the local cloud print path (path 2 in FIG. 1) and contains the job ID issued on the CPS 1022.

In step S510, the CPU 111 of the MFP 101 as the local printer having received the print job cooperates with the printer 120 to execute printing based on the received print job. A sheet with a print image printed thereon based on the print job is discharged onto a sheet discharge tray (not illustrated).

When the printing is completed, in step S511, the MFP 101 transmits a print result notification to the CPS 1022. The CPS 1022 updates a print job execution result that is managed on the CPS 1022 using the notified print result. The execution result also contains the job ID. The CPS 1022 updates a job execution status based on the job ID contained in the execution result. As a result of the updating processing, the records such as the number of prints printed locally are aggregated and managed as appropriate on the CPS 1022 even in a case where the local cloud print function is used.

<Case B: Print Control in Case Where Local Printer is Not Detected>

Next, the print control in a case where a local printer is not found as a result of the search processing in step S504 will be described below with reference to steps S521 to S528. In a case where a local printer is not found as a result of the search processing, in step S521, the manager 303 determines to execute printing through the path 1. In this case, in a case where the device information group 314 does not store device information corresponding to the selected output destination printer, the manager 303 transmits an inquiry for printer capability information to the CPS 1022 and stores the capability information in the device information group 314. Then, the manager 303 updates the filter pipeline module, the print setting information, and the output destination based on the device information corresponding to the output destination printer.

Next, the user performs an operation to execute printing. In step S522, in a case where the OS 210 detects the user operation to execute printing, in step S523, the OS 210 performs a transmission control.

Next, a sequence of step S523 will be described. The manager 303 converts the drawing data received from the application 220 via the spooler 302 into PDL data using the configured filter pipeline module. Then, the manager 303 generates a print job containing the PDL data and the print setting information and stores the generated print job in the print queue 301. The output destination of the print job stored in the print queue 301 is changed to the virtual printer object corresponding to the output destination printer that is managed on the CPS 1022 as a result of the changing processing in step S521. The OS 210 transmits the print job data stored in the print queue 301 to the CPS 1022 based on the changed output destination setting. The CPS 1022 passes the print job to the virtual printer object. The virtual printer object temporarily spools the received print job. Next, in step S524, the CPS 1022 receives a request to check whether a print job is submitted from the MFP 101, and this triggers execution of the processing of acquiring a print job and printing the print job in steps S525 to S527. After the printing is completed, in step S528, the MFP 101 transmits a print result notification to the CPS 1022.

Figure 6:
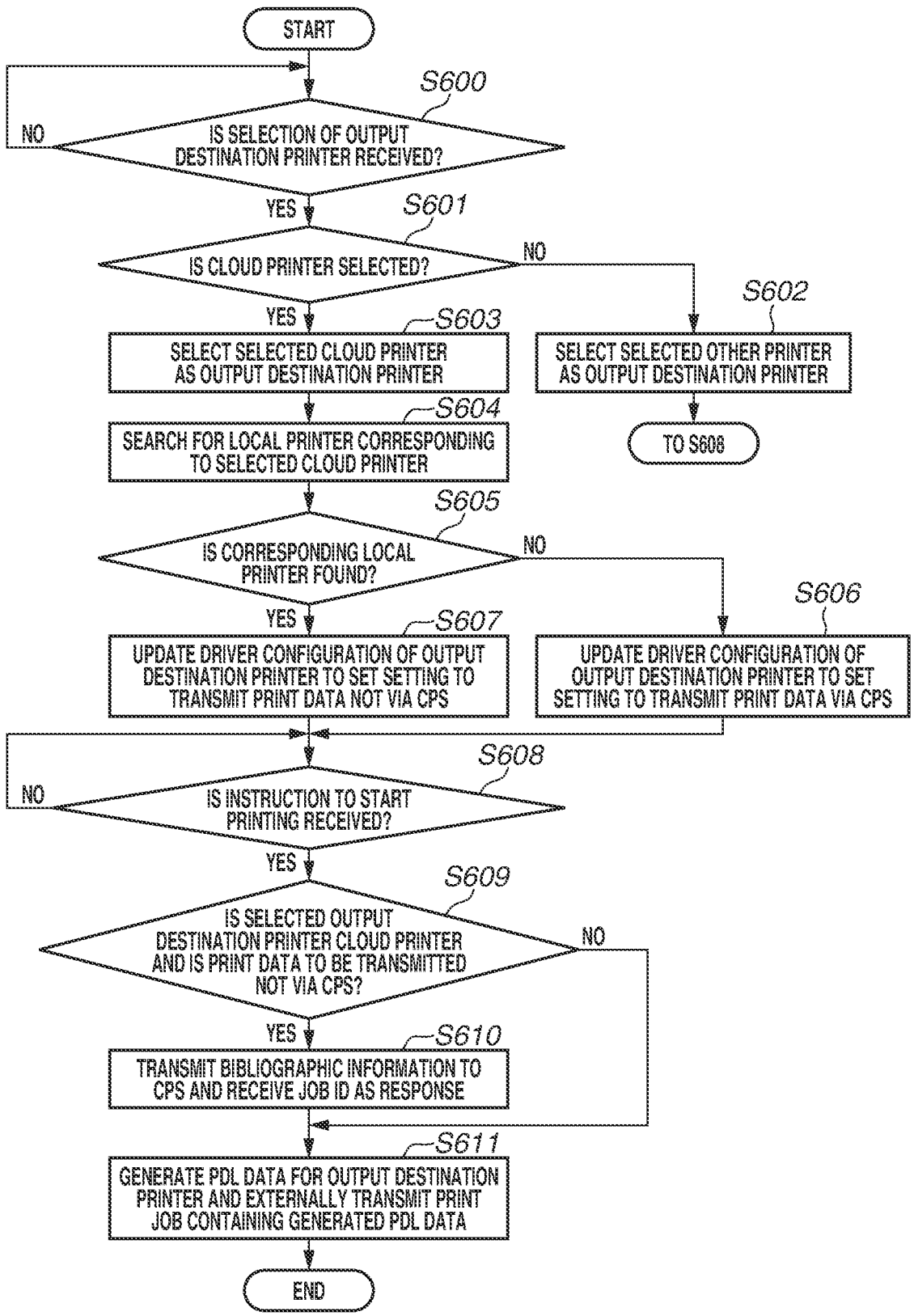
FIG. 6 is a flowchart illustrating an example of a process of printing by the information processing apparatus 103.

Next, a specific process of controlling the changing in the information processing apparatus 103 will be described with reference to a flowchart in FIG. 6. FIG. 6 is a flowchart illustrating a print control process in the information processing apparatus 103. Each operation illustrated in the flowchart in FIG. 6 is implemented by reading a program for achieving the modules, the components, and the application 220 in FIG. 4 to the RAM 133 and executing the read program by the CPU 131. To specify what performs processing, the modules, the components, and the application 220 are described as a subject as needed.

The flowchart in FIG. 6 selectively illustrates the series of print control from the selection of a printing apparatus to the completion of printing by the information processing apparatus 103.

In step S600, the OS 210 determines whether selection of an output destination printer is received. In a case where selection of an output destination printer is received (YES in step S600), the processing proceeds to step S601. On the other hand, in a case where selection of an output destination printer is not received (NO in step S600), the OS 210 waits for selection by the user.

In step S601, the OS 210 determines whether a user operation to select a cloud printer managed on the CPS 1022 as an output destination is received. In a case where a user operation to select a cloud printer managed on the CPS 1022 as an output destination is received (YES in step S601), the processing proceeds to step S603. On the other hand, in a case where a user operation to select another printer that is not a cloud printer managed on the CPS 1022 as an output destination is received (NO in step S601), the processing proceeds to step S602.

In step S602, the OS 210 selects the selected other printer as an output destination printer, and the processing proceeds to step S608.

In step S603, the OS 210 cooperates with the manager 303 to select the selected cloud printer as an output destination printer. Then, in step S604, the manager 303 transmits to the local printer search module 304 a request to search for a local printer corresponding to the selected cloud printer. The search control performed in step S604 is similar to the search control in step S504 described above, so that redundant descriptions thereof are omitted.

Next, in step S605, the manager 303 receives a search result from the local printer search module 304 and determines whether the corresponding local printer is found based on the search result. In a case where the corresponding local printer is found (YES in step S605), the processing proceeds to step S607. On the other hand, in a case where the corresponding local printer is not found (NO in step S605), the processing proceeds to step S606.

In step S606, the manager 303 updates a driver configuration of the output destination printer as needed so as to make a setting to transmit print data via the CPS 1022. The updating processing is similar to the processing in step S521 in FIG. 5 described above. More specifically, the processing of configuring the filter pipeline module, the processing of changing the print setting information based on the capability information managed by the CPS 1022, and the processing of changing the output destination to the virtual printer object of the CPS 1022 are performed as needed.

On the other hand, in step S607, the manager 303 updates the driver configuration of the output destination printer so as to make a setting to transmit print data not via the CPS 1022. The updating processing is similar to the processing in step S506 in FIG. 5 described above. More specifically, the processing of configuring the filter pipeline module based on the PDL capabilities supported by the local printer and the processing of changing the print setting information based on the capability information about the local printer are performed. Further, the processing of changing the output destination to the local printer is performed.

In step S608, the OS 210 determines whether an instruction to start printing is received. In a case where the OS 210 determines that a user instruction to start printing is received via a print dialog (not illustrated) provided by the OS 210 (YES in step S608), the processing proceeds to step S609. On the other hand, in a case where a user instruction to start printing is not received (NO in step S608), the OS 210 waits for a user instruction such as an instruction to change the print settings or an instruction to start printing. In a case where an instruction to change the print settings is received, the manager 303 updates the PrintTicket indicating the print settings based on the change instruction.

In step S609, the OS 210 determines whether the selected output destination printer is a cloud printer on the CPS 1022 and whether this is a case where print data is to be transmitted to the local printer not via the CPS 1022. In a case where the OS 210 determines that the selected output destination printer is a cloud printer on the CPS 1022 and that this is a case where print data is to be transmitted to the local printer not via the CPS 1022 (YES in step S609), the processing proceeds to step S610. On the other hand, in a case where the OS 210 determines that this is not a case where print data is to be transmitted to the local printer not via the CPS 1022 (NO in step S609), the processing proceeds to step S612.

In step S610, the OS 210 transmits the bibliographic information about the print job to the CPS 1022. The CPS 1022 having received the bibliographic information generates job management information containing the job ID based on the bibliographic information and manages the status of the print job on the CPS 1022. After the job management information is generated, the CPS 1022 transmits to the information processing apparatus 103 a response containing the job ID to the bibliographic information.

In step S609, the application 220, the OS 210, and the print framework 300 cooperate with each other to execute the processing of generating PDL data and the processing of transmitting a print job. The manager 303 converts the drawing data received from the application 220 via the spooler 302 into PDL data using the configured filter pipeline module. Then, the manager 303 generates a print job containing the PDL data and the print setting information and stores the generated print job in the print queue 301. The OS 210 transmits the print job data stored in the print queue 301 to the output destination based on the output destination setting. In a case where the updating processing in step S610 is performed, the manager 303 next generates a print job containing the PDL data, the print setting information, and the job ID received from the CPS 1022, and stores the generated print job in the print queue 301.

As described above, according to the present exemplary embodiment, the communication path can be changed based on a result of the determination in step S605. Thus, in a case where a cloud printer is selected as an output destination printer and a local printer associated with the cloud printer is accessible not via the CPS 1022, a print job is transmitted not via the CPS 1022. This reduces the cost of maintaining the cloud resources of the provider for providing the CPS 1022. Furthermore, a notification that the print job is transmitted not via the cloud is provided as appropriate to the CPS 1022. Further, a notification of a result of executing the print job is transmitted together with the job ID from the MFP 101 to the CPS 1022. The CPS 1022 updates the job status on the CPS 1022 based on the job ID. Thus, even in a case where the local cloud print function is used, the print record for each user is managed as appropriate on the CPS 1022.

In the first exemplary embodiment, a case where a print job is always transmitted not via the CPS 1022 in a case where a local printer associated with a cloud printer is accessible not via the CPS 1022 is described as an example.

A second exemplary embodiment provides a system that enables more flexible path selection.

For example, in a case where the size of data is small, the data can be processed as appropriate with the resources that are pre-estimated by the CPS 1022. Taking this case into consideration, a system that attempts to print locally only in a case where a data size exceeds a predetermined upper limit size will be described.

Furthermore, there is a case where a print content is to be reviewed on the CPS 1022 using an artificial intelligent (AI) technology. In this case, all print jobs should be transmitted via the CPS 1022. Thus, in the second exemplary embodiment, an operation setting for control not to use the local print function is provided even in a case where the upper limit size of reception is exceeded.

Details thereof will be described. FIGS. 8A and 8B illustrate an example of a property screen of the shared printer driver 311 that is displayed by the OS 210. A screen 801 illustrates a case where a device setting tab 802 is selected. The screen 801 contains a checkbox 804 and a message 803 indicating the corresponding setting. In FIG. 8A, a case where the checkbox 804 is checked to enable an operation setting to "prioritize local printing" is illustrated as an example. The user can select whether to enable or disable the operation setting to "prioritize local printing" by selecting the checkbox 804. In a case where the operation setting is enabled, the print path selection control according to the first exemplary embodiment is performed. In a case where the operation setting to "prioritize local printing" is on, the screen 801 is displayed so that a checkbox 806 indicating an exception setting for a case where the upper limit size is exceeded and a message 805 are grayed out and an instruction to change the settings cannot be received.

On the other hand, in a case where an operation to disable the operation setting to "prioritize local printing" is received, the OS 210 displays a screen 810. On the screen 810, the checkbox 806 and the corresponding message 805 that are grayed out on the screen 801 are in a normal state in which an instruction can be received. The user can change the exception setting for a case where the upper limit size is exceeded by operating a checkbox 815. The settings made via the setting screen are stored in the device information group 314 of the shared printer driver 311. The settings are shared and used in a case where printing is executed using an output destination printer under the CPS 1022.

The screens 801 and 810 are configured to be presented only to a user having an administrator right. Further, the screens 801 and 810 may be configured to define an operation setting policy as a policy for each tenant on the CPS 1022. In this case, the OS 210 controls restrictions to only allow a user to make the settings based on the operation setting policy set for each tenant even in a case where the user has an administrator right. For example, the screens 801 and 810 can be configured so as to make a policy setting to force to prioritize local printing and a policy setting to ban local printing on the CPS 1022. The OS 210 acquires the policy settings from the CPS 1022 and restricts changes to the operation settings based on the policy settings.

Next, a specific print control process will be described with reference to a flowchart in FIG. 9. Processing performed in steps S901 to S903 is similar to the output destination selection control in steps S601 to S603 in the first exemplary embodiment, so that redundant descriptions thereof are omitted.

In step S911, the manager 303 refers to the device information group 314 to determine whether the operation setting to prioritize local printing is set. In a case where the manager 303 determines that the operation setting to prioritize local printing is set (YES in step S911), the processing proceeds to step S604. On the other hand, in a case where the manager 303 determines that the operation setting to prioritize local printing is not set (NO in step S911), the processing proceeds to step S912.

In step S912, the manager 303 updates the driver configuration as needed to set the setting to transmit print data via the CPS 1022. This updating processing is similar to the processing in step S606 according to the first exemplary embodiment.

In step S913, the OS 210 determines whether an instruction to start printing is received. In a case where an instruction to start printing is received (YES in step S913), the processing proceeds to step S914. On the other hand, in a case where an instruction to start printing is not received (NO in step S913), the OS 210 waits for a further user instruction such as an instruction to change the print settings or an instruction to start printing.

In step S914, the application 220, the OS 210, and the print framework 300 cooperate with each other to start generating PDL data.

In step S915, whether the size of the PDL data reaches the upper limit size of the output destination printer is determined. In a case where the size of the PDL data reaches the upper limit size of the output destination printer while the PDL data is generated (YES in step S915), the processing proceeds to step S917. On the other hand, in a case where the data conversion is completed without the size of the PDL data reaching the upper limit size of the output destination printer while the PDL data is generated (NO in step S915), the processing proceeds to step S916. In step S916, the OS 210 transmits to the CPS 1022 the print job that is stored in the print queue 301 and contains the PDL data generated in step S914.

On the other hand, in step S917, the manager 303 refers to the device information group 314 to determine whether a setting to attempt local printing in a case where the upper limit size is reached is set.

In a case where the manager 303 determines that the setting to attempt local printing in a case where the upper limit size is reached is set (YES in step S917), the processing proceeds to step S918. On the other hand, in a case where the manager 303 determines that the setting to attempt local printing in a case where the upper limit size is reached is not set (NO in step S917), the processing proceeds to step S922.

In step S922, the manager 303 stops generating PDL data and presents a print error notification on the operation unit 137 of the information processing apparatus 103. After the notification is completed, the process is terminated.

On the other hand, in step S918, the manager 303 performs search processing to search for a local printer corresponding to the selected cloud printer. This processing is similar to the processing in step S604 according to the first exemplary embodiment. In step S919, the manager 303 receives a result of the search from the local printer search module 304 and determines whether the corresponding local printer is found. In a case where the corresponding local printer is found (YES in step S919), the processing proceeds to step S920. On the other hand, in a case where the corresponding local printer is not found (NO in step S919), the processing proceeds to step S922 to perform error processing.

In step S920, the manager 303 updates the driver configuration to be able to transmit print data not via the CPS 1022 as in step S607 according to the first exemplary embodiment.

In step S921, the application 220, the OS 210, and the print framework 300 cooperate with each other to regenerate PDL data and transmit a print job to the local printer.

The process described above enables more flexible path setting as intended by the administrator of the information processing apparatus 103 or the administrator of the CPS 1022.

<Modified Example>

The first exemplary embodiment can be modified as follows. The first exemplary embodiment may be modified to include the operation setting to attempt local printing. In this case, in a case where the setting to attempt local printing is set, processing in step S604 and subsequent steps may be performed. On the other hand, in a case where the setting not to attempt local printing is set, the search for a local printer associated with a cloud printer is skipped, and the processing proceeds to step S606.

Further, the second exemplary embodiment can be modified as follows. For example, the second exemplary embodiment may be modified not to include the operation settings illustrated as an example in FIG. 8 and to attempt printing via a local network only in a case where the upper limit size is reached. In this case, the printing processing is terminated with an error in a case where a local printer associated with a cloud printer is not found as a result of the printer search via the local network. Further, the second exemplary embodiment may be modified not to include the operation setting described above with reference to the message 803 and the checkbox 804 in FIG. 8. In this case, the information processing apparatus 103 performs the control without the processing in step S911 in FIG. 9.

Further, while a case where the determination of whether the upper limit size is reached is performed by the information processing apparatus 103 is described as an example in the second exemplary embodiment, it is not limited thereto. The determination of whether the upper limit size is reached may be performed on the CPS 1022. In this case, the CPS 1022 transmits an error notification to the information processing apparatus 103 in a case where the upper limit size is reached. The print framework 300 of the information processing apparatus 103 having received the error notification may stop generating PDL data and perform the processing in step S917 and subsequent steps in response to the reception of the notification.

Further, a case where the upper limit size is exceeded is described as an example of an exception in the second exemplary embodiment. Further, the second exemplary embodiment can be modified to attempt local printing as an exception in a case where the CPS 1022 is inaccessible due to a cause such as a failure of the cloud platform 102 or the CPS 1022.

Further, while a case where the printing processing is terminated with an error in step S922 is described as an example in the second exemplary embodiment, it is not limited thereto. For example, the manager 303 may perform control to divide a single print job into a plurality of print jobs within the upper limit size and transmit the divided print jobs.

In the first and second exemplary embodiments, a case where the print framework 300 provided by the OS 210 and the shared printer driver 311 cooperate with each other to implement the changing processing is described as an example. However, it is not limited thereto. For example, a mobile print framework such as Android® OS or iOS® can perform similar path changing processing.

As described above, a system that determines whether transmission of a print job to a printer associated with a cloud printer of a CPS not via the CPS is allowed, and transmits the print job through a path not via the CPS based on a result of the determination can be provided.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-145982, filed Aug. 31, 2020, which is hereby incorporated by reference herein in its entirety.

What is claimed is:

1. An information processing apparatus configured to communicate with a cloud print service, the information processing apparatus comprising:
at least one memory that stores a set of instructions; and
at least one processor that executes the instructions, the instructions, when executed, causing the information processing apparatus to perform operations comprising:
determining whether transmission of a print job to a printer associated with a cloud printer not via the cloud print service is allowed in a case where the cloud printer on the cloud print service is selected as an output destination;
transmitting the print job to the printer associated with the cloud printer through a path not via the cloud print service in a case where it is determined that transmission of the print job to the printer associated with the cloud printer not via the cloud print service is allowed; and
receiving, in response to receiving a first setting with printing not via the cloud print service prioritized, a second setting whether to allow the printing not via the cloud print service in a case where a data size of the print job to be transmitted to the cloud print service exceeds an upper limit size for the cloud print service,
wherein the transmitting transmits the print job to the printer not via the cloud print service in a case where a setting to be allowed is set in the second setting, and the print job is processed as a print error in a case where the setting to be allowed is not received.

2. A method of controlling an information processing apparatus that communicates with a cloud print service, the method comprising:
determining whether transmission of a print job to a printer associated with a cloud printer not via the cloud print service is allowed in a case where the cloud printer on the cloud print service is selected as an output destination;
transmitting the print job to the printer associated with the cloud printer through a path not via the cloud print service in a case where it is determined that transmission of the print job to the printer associated with the cloud printer not via the cloud print service is allowed; and
receiving, in response to receiving a first setting with printing not via the cloud print service prioritized, a second setting whether to allow the printing not via the cloud print service in a case where a data size of the print job to be transmitted to the cloud print service exceeds an upper limit size for the cloud print service,
wherein the transmitting transmits the print job to the printer not via the cloud print service in a case where a setting to be allowed is set in the second setting, and the print job is processed as a print error in a case where the setting to be allowed is not received.

3. The method according to claim 2, further comprising transmitting the print job to the cloud printer on the cloud print service in a case where it is determined that transmission of the print job to the printer associated with the cloud printer not via the cloud print service is not allowed.

4. The method according to claim 2, further comprising searching for a printer via a network,
wherein it is determined, in a case where a printer corresponding to identification information about the cloud printer is found as a result of the search, that transmission of the print job to the printer associated with the cloud printer not via the cloud print service is allowed.

5. The method according to claim 4, wherein a search packet containing the identification information is transmitted on the network to search for a printer on the network.

6. The method according to claim 4,
wherein a broadcast packet is used to search for a printer on the network, and
wherein it is determined, in a case where a printer found as a result of the search includes a printer having identification information corresponding to the identification information about the cloud printer, that transmission of the print job to the printer associated with the cloud printer not via the cloud print service is allowed.

7. The method according to claim 2, further comprising:
generating page description language (PDL) data based on data received from an application; and
determining whether a size of the generated PDL data reaches the upper limit size,
wherein the print job is transmitted, in a case where it is determined that the size of the generated PDL data does not reach the upper limit size, to the cloud printer on the cloud print service regardless of whether transmission of the print job to the printer associated with the cloud printer not via the cloud print service is allowed.

8. The method according to claim 7, further comprising:
making a setting whether to attempt to transmit the print job not via the cloud print service in a case where the size of the generated PDL data reaches the upper limit size; and
stopping transmitting the print job in a case where the setting not to attempt to transmit the print job not via the cloud print service is made in a case where the size of the generated PDL data reaches the upper limit size, and it is determined that the size of the generated PDL data reaches the upper limit size.

9. The method according to claim 7, further comprising:
making a setting whether to attempt to transmit the print job not via the cloud print service in a case where the size of the generated PDL data reaches the upper limit size; and
dividing the print job into a plurality of jobs and transmitting the plurality of jobs to the cloud print service in a case where the setting not to attempt to transmit the print job not via the cloud print service is made in a case where the size of the generated PDL data reaches the upper limit size and it is determined that the size of the generated PDL data reaches the upper limit size.

10. The method according to claim 2, further comprising transmitting bibliographic information about the print job to the cloud print service in a case where the print job is to be transmitted to the printer through the path not via the cloud print service.

11. The method according to claim 10, further comprising:
receiving a result of execution of the print job from the printer; and
notifying the cloud print service of the received result.

12. A non-transitory computer-readable storage medium storing a computer-executable program for causing a computer to execute a method for controlling an information processing apparatus configured to communicate with a cloud print service, the method comprising:
determining whether transmission of a print job to a printer associated with a cloud printer not via the cloud print service is allowed in a case where the cloud printer on the cloud print service is selected as an output destination;

transmitting the print job to the printer associated with the cloud printer through a path not via the cloud print service in a case where it is determined that transmission of the print job to the printer associated with the cloud printer not via the cloud print service is allowed; and receiving, in response to receiving a first setting with printing not via the cloud print service prioritized, a second setting whether to allow the printing not via the cloud print service in a case where a data size of the print job to be transmitted to the cloud print service exceeds an upper limit size for the cloud print service, wherein the transmitting transmits the print job to the printer not via the cloud print service in a case where a setting to be allowed is set in the second setting, and the print job is processed as a print error in a case where the setting to be allowed is not received.

* * * * *